(12) United States Patent
Yoo et al.

(10) Patent No.: US 11,617,383 B2
(45) Date of Patent: Apr. 4, 2023

(54) METHOD OF MANUFACTURING KOREAN TRADITIONAL RICE TAFFY

(71) Applicant: Hojeong Food Co., Ltd., Damyang-gun (KR)

(72) Inventors: Young Goon Yoo, Damyang-gun (KR); Su Jin Yoo, Gwangju (KR); Seong Gyu Yoo, Damyang-gun (KR)

(73) Assignee: HOJEONG FOOD CO., LTD., Damyang-Gun (KR)

( * ) Notice: Subject to any disclaimer, the term of this patent is extended or adjusted under 35 U.S.C. 154(b) by 221 days.

(21) Appl. No.: 17/118,811

(22) Filed: Dec. 11, 2020

(65) Prior Publication Data
US 2022/0125082 A1    Apr. 28, 2022

(30) Foreign Application Priority Data
Oct. 27, 2020    (KR) .................. 10-2020-0140498

(51) Int. Cl.
*A23L 7/25*    (2016.01)
*A23L 7/104*    (2016.01)

(52) U.S. Cl.
CPC ................. *A23L 7/25* (2016.08); *A23L 7/104* (2016.08); *A23V 2002/00* (2013.01)

(58) Field of Classification Search
CPC ........ A23L 7/25; A23L 7/104; A23V 2002/00
USPC .......................................................... 426/28
See application file for complete search history.

(56) References Cited

PUBLICATIONS

JP-09009872—English Abstract (Year: 1995).*
JP-09009872—Machine Translation (Year: 1997).*
KR 2006065359—English Abstract (Year: 2006).*
KR-1020060065359—Machine Translation (Year: 2007).*

* cited by examiner

*Primary Examiner* — Hamid R Badr
(74) *Attorney, Agent, or Firm* — Lex IP Meister, PLLC

(57) ABSTRACT

Provided is a method of manufacturing rice taffy, and more specifically, a method of manufacturing rice taffy having excellent functionality by adding collagen. The method of manufacturing rice taffy according to the present invention includes a saccharification step of saccharifying a mixture of hard-boiled rice, malt, and water and thus obtaining a saccharified solution, a concentration step of concentrating the saccharified solution by applying heat and thus obtaining black taffy, an addition step of adding collagen to the black taffy, and a stretching step of repeatedly stretching the black taffy to which collagen was added.

2 Claims, No Drawings

METHOD OF MANUFACTURING KOREAN TRADITIONAL RICE TAFFY

CROSS-REFERENCE TO RELATED APPLICATION

This application claims priority to and the benefit of Korean Patent Application No. 10-2020-0140498, filed on Oct. 27, 2020, the disclosure of which is incorporated herein by reference in its entirety.

BACKGROUND

1. Field of the Invention

The present invention relates to a method of manufacturing Korean traditional rice taffy, and more specifically, to a method of manufacturing Korean traditional rice taffy having excellent functionality by adding collagen.

2. Discussion of Related Art

Yeot is a type of Korean traditional food made by fermenting grain starch with malt and then boiling the resultant. There are various types of yeot, such as liquid yeot, soft yeot, and hard yeot depending on moisture content.

There are a variety of grains that can be used in the manufacture of yeot. Any grain containing starch can be used to make yeot. For example, grains such as rice, corn, wheat, rye, oats, millet, proso millet, buckwheat, barnyard millet, sorghum, red beans, adlay, barley, and the like may be used. In addition to grains, sweet potatoes, pumpkins, and potatoes are also used as raw materials for yeot.

Rice taffy is a yeot made using rice as a grain ingredient. When a saccharified solution prepared by mixing and saccharifying hard-boiled rice (hard steamed rice having low moisture content) with malt and water is boiled to concentrate the mixture to a moisture content of about 20%, thick grain syrup is obtained. When the grain syrup is additionally boiled to concentrate the grain syrup to a moisture content of 10% or less, black taffy (black yeot) is obtained. When the black taffy is repeatedly stretched and folded in half before it hardens, the color lightens, and finally, white taffy is obtained, and when this white taffy is stretched to a great length and then hardens, rice taffy having a thickness of a finger is obtained.

Recently, rice taffy in which various food ingredients are added to enhance flavor or nutrition and functionality is being researched.

Korean Laid-Open Patent Application No. 10-2013-0139632 discloses a method of manufacturing colored yeot by adding natural pigments derived from turmeric, cactus, bamboo leaf, and black sesame. In addition, Korean Laid-Open Patent Application No. 10-2013-0094938 discloses a method of manufacturing embryo bud yeot by adding embryo bud powder, and Korean Laid-Open Patent Application No. 10-2003-0083205 discloses a *Rubus coreanus* yeot composition and a preparation method thereof.

As such, rice taffy with various added ingredients has been researched, but rice taffy to which collagen is added is not yet known.

SUMMARY OF THE INVENTION

The present invention is directed to providing a method of manufacturing rice taffy having excellent functionality by adding collagen.

A method of manufacturing rice taffy of the present invention includes: a saccharification step of saccharifying a mixture of hard-boiled rice, malt, and water and thus obtaining a saccharified solution; a concentration step of concentrating the saccharified solution by applying heat and thus obtaining black taffy; an addition step of adding collagen to the black taffy; and a stretching step of repeatedly stretching the black taffy to which collagen was added.

The collagen is marine collagen extracted from fish.

In the addition step, a *Vicia amurensis* extract from *Vicia amurensis* is additionally added.

DETAILED DESCRIPTION OF EXEMPLARY EMBODIMENTS

Hereinafter, a method of manufacturing rice taffy according to exemplary embodiments of the present invention will be described.

A method of manufacturing rice taffy of the present invention includes: a saccharification step of saccharifying a mixture of steamed rice, malt, and water and thus obtaining a saccharified solution; a concentration step of concentrating the saccharified solution by applying heat and thus obtaining black taffy; an addition step of adding collagen to the black taffy; and a stretching step of repeatedly stretching the black taffy to which collagen was added. Hereinafter, each of these steps will be described in detail.

1. Saccharification Step

In the saccharification step, a mixture of hard-boiled rice, malt, and water is saccharified, and thus a saccharified solution is obtained.

In one example of the saccharification step, a uniform mixture obtained by mixing 2 to 10 parts by weight of malt and 100 to 200 parts by weight of water with 100 parts by weight of hard-boiled rice is input in a heat-insulated container and saccharified by being maintained at a temperature of 50 to 70° C. for 6 to 10 hours.

The hard-boiled rice may be obtained by soaking rice in water for 12 hours and then steaming the same with hot steam for one hour.

Malt is obtained by germinating and drying barley and contains many enzymes such as α-amylase, β-amylase, and proteases capable of breaking down starch and proteins.

After saccharification, the contents of the heat-insulated container are filtered through a sieve or cotton cloth. A saccharified solution from which solids are removed is obtained through filtration. The saccharified solution is heated at a temperature of 90 to 98° C. for 20 to 60 minutes to stop the activity of the enzymes contained in the saccharified solution.

2. Concentration Step

Next, a concentration step is performed.

The concentration step is a process of concentrating the saccharified solution to make grain syrup and further concentrating the grain syrup to make black taffy.

Heat is applied to the saccharified solution to concentrate the saccharified solution. For example, the saccharified solution is input in a pot and boiled over high heat until about 50% volume. Then, the heat is reduced, and light heat is applied until bubbles form while continuously stirring to prevents the contents from sticking to the bottom of the pot. The time when the bubbles begin to form is when the grain syrup is formed. When the grain syrup is continuously heated to a moisture content of 6 to 10% by weight, soft, brownish black taffy is obtained.

3. Addition Step

Next, an addition step is performed.

In the addition step, collagen is added to the black taffy. In one example of the addition step, 2 to 10 parts by weight of collagen is added to 100 parts by weight of black taffy and then evenly mixed.

Collagen is beneficial for health and thus can increase the functionality of rice taffy. In addition, the texture of rice taffy can be improved due to the addition of collagen. As the collagen, a commercialized collagen product may be used. The commercialized collagen product may be in powder or liquid form.

Collagen is the most abundant protein in the animal body and is known to account for about 30% or more of body protein. Collagen is a major protein in connective tissues of animals, supports tissues and organs, and maintains body shape. Collagen is a major constituent of connective tissues such as skin, cartilage, and bone in a living body and is widely distributed throughout the body, such as in the skin, bones, cartilage, blood vessels, and intestines.

Collagen has been applied as a raw material for gelatin, and recently, application fields of collagen are becoming more diverse. Collagen is not only used as a material for pharmaceuticals, but is also used as a material for cosmetics because collagen has a function of increasing the moisture content of the skin.

Collagen that can be used in the present invention may be collagen derived from terrestrial livestock such as cattle, pigs, and chickens, or marine collagen derived from fish. Preferably, marine collagen is used.

Marine collagen has the advantage of being safer than collagen derived from terrestrial livestock. Among the marine collagens, one having a low-molecular-weight peptide form is used. For example, marine collagen in the form of a 600 to 6000 Da peptide may be used. Such low-molecular-weight marine collagen has a high absorption rate in the body.

4. Stretching Step

Next, a stretching step in which the black taffy to which collagen was added is repeatedly stretched is performed.

In one example of the stretching step, the black taffy is stretched from both sides by two people, folded in half, and stretched again, and this operation is repeated for about 10 to 30 minutes. Through this stretching step, the color of the black taffy, which is initially brown, becomes white, and as the taffy comes into contact with air, a large number of holes are formed inside the taffy.

After the stretching step, when the elongated product is cut into a predetermined length (2 to 20 cm), rice taffy is obtained.

Meanwhile, in another exemplary embodiment of the present invention, rice taffy may be manufactured by adding a *Vicia amurensis* extract. For example, collagen and a *Vicia amurensis* extract are added to black taffy in the above-described addition step. For example, 2 to 10 parts by weight of collagen and 1 to 5 parts by weight of a *Vicia amurensis* extract may be added based on 100 parts by weight of black taffy.

The *Vicia amurensis* extract is extracted from the leaves of *Vicia amurensis*. *Vicia amurensis* is a perennial vine belonging to the Fabaceae family.

Various extraction methods may be used to obtain the *Vicia amurensis* extract. One of the extraction methods includes adding an extraction solvent to *Vicia amurensis*.

As the extraction solvent, at least any one selected from water, a lower alcohol having 1 to 4 carbon atoms, a polyhydric alcohol, or a combination thereof may be used. Methanol, ethanol, or the like may be used as the lower alcohol having 1 to 4 carbon atoms, and butylene glycol, propylene glycol, and pentylene glycol may be used as the polyhydric alcohol. As the combination, a mixture of water and the lower alcohol, a mixture of water and the polyhydric alcohol, a mixture of the lower alcohol and the polyhydric alcohol, or a mixture of water and the lower alcohol and the polyhydric alcohol may be used.

In one example, the extraction may be carried out at a temperature of 10 to 150° C. for 2 to 48 hours by adding an extraction solvent that is 2 to 20 times the weight of leaves of *Vicia amurensis*. After the extraction, the resultant may be filtered with a filter paper to remove solid contents therefrom, and thereby a liquid *Vicia amurensis* extract is obtained. In addition, the liquid *Vicia amurensis* extract can be made into a powder form through processing such as freeze-drying or spray-drying and used.

The *Vicia amurensis* extract enhances the antioxidant activity of rice taffy and thus inhibits the rancidity and decomposition of rice taffy.

Hereinafter, a method of manufacturing the rice taffy of the present invention will be described through Examples. However, Examples described below are provided to specifically illustrate the present invention and are not intended to limit the scope of the present invention.

Example 1

Rice washed with water was immersed in water and soaked in water for 12 hours and then was steamed for one hour to make hard-boiled rice. Based on 100 parts by weight of the hard-boiled rice, 6 parts by weight of malt and 150 parts by weight of water were added, and the mixture was input in a heat-insulated container and saccharified by being maintained at a temperature of 60° C. for eight hours. After saccharification, the contents of the heat-insulated container were filtered through a cotton cloth to remove solid contents therefrom, and thereby a saccharified solution was obtained. The saccharified solution was heated at 95° C. for 40 minutes to stop the activity of enzymes, and then was placed in a pot and heated to concentrate until brownish black taffy was obtained. Subsequently, based on 100 parts by weight of the black taffy, 6 parts by weight of collagen (fish collagen powder commercially available from GNM Life, Republic of Korea) was added. Subsequently, the black taffy to which collagen was added was repeatedly stretched and folded in half for 20 minutes, and then stretched to a great length and cut into a length of 5 cm, and thereby white rice taffy was obtained.

Example 2

Rice taffy was obtained in the same manner as in Example 1 except that based on 100 parts by weight of the black taffy, 6 parts by weight of collagen and 3 parts by weight of a *Vicia amurensis* extract was added.

The *Vicia amurensis* extract was obtained by adding water that is ten times the weight of leaves of *Vicia amurensis* collected in Jinan-gun, Jeollabuk-do, Republic of Korea, carrying out extraction at 90° C. for six hours, and filtering the resultant through a sieve.

Comparative Example

Rice taffy was prepared in the same manner as in Example 1 except that collagen was not added.

<Sensory Evaluation>

Sensory evaluation of the rice taffy of Examples 1 and 2 and Comparative Example was performed. The sensory evaluation was conducted by selecting 30 trained panelists.

In a first part of the sensory evaluation, the color, taste, and aroma of the rice taffy and the overall preference for the rice taffy were evaluated on a 7-point scale. Each item was rated 7 (excellent), 6 (good), 5 (slightly good), 4 (moderate), 3 (slightly poor), 2 (poor), or 1 (very poor).

In a second part of the sensory evaluation, a degree to which rice taffy sticks to teeth when chewed was evaluated on a 5-point scale. This item was rated 5 (not sticky), 4 (slightly sticky), 3 (moderately sticky), 2 (very sticky), or 1 (extremely sticky).

Each item of the sensory evaluation was evaluated three times, and the average of the scores excluding the highest and lowest points was calculated.

The results of evaluating for the color, taste, and aroma of the rice taffy and the overall preference for the rice taffy in the first part of the sensory evaluation are shown below in Table 1.

TABLE 1

| Classification | Color | Taste | Aroma | Overall preference |
|---|---|---|---|---|
| Example 1 | 5.6 | 5.2 | 5.3 | 5.1 |
| Example 2 | 5.4 | 5.7 | 5.8 | 5.7 |
| Comparative Example | 5.1 | 4.3 | 4.5 | 4.2 |

Based on the results shown in Table 1, it can be seen that there was no significant difference between Examples 1 and 2 and Comparative Example in terms of color. However, Examples 1 and 2 received more points than Comparative Example in the areas of taste, aroma, and overall preference. The results of evaluating the degree of the rice taffy sticking to teeth in the second part of the sensory evaluation are shown below in Table 2.

TABLE 2

| Classification | Degree of rice taffy sticking to teeth |
|---|---|
| Example 1 | 4.5 |
| Example 2 | 4.4 |
| Comparative Example | 2.1 |

Based on the results shown in Table 2, it can be seen that the rice taffy of Examples 1 and 2 hardly stuck to teeth. This seems to be because the collagen particles contained in the rice taffy reduce the stickiness of the rice taffy and thus prevent the rice taffy from sticking to teeth. On the other hand, it can be seen that the rice taffy of Comparative Example stuck to teeth to a large extent and was difficult to chew.

<Antioxidant Activity>

The antioxidant activities of the rice taffy of Examples 1 and 2 and Comparative Example were evaluated by measuring the radical-scavenging activities of the same. An extract obtained by adding water that is five times the weight of rice taffy and carrying out extraction at 60° C. for two hours was used as a sample.

Each sample was filtered under reduced pressure with filter paper (Whatman, No. 2) to remove solid contents therefrom and was diluted to a concentration of 1,000 ppm by adding distilled water. 0.5 mL of 0.2 mM 1,1-diphenyl-2-picrylhydrazyl (DPPH) was added to 2 mL of the diluted sample, stirred, and allowed to stand for 30 minutes, and absorbance was measured at 517 nm.

The radical-scavenging activity of the groups with or without the addition of the sample was determined as a rate of decrease in the absorbance. The radical-scavenging activity was calculated by the following equation and is shown below in Table 3.

Radical-scavenging activity (%)=(1−Absorbance in group with addition of sample/Absorbance in group without addition of sample)×100

TABLE 3

| Classification | Radical-scavenging activity (%) |
|---|---|
| Example 1 | 28.5 ± 0.8 |
| Example 2 | 44.1 ± 0.4 |
| Comparative Example | 23.7 ± 0.5 |

Based on the results shown in Table 3, it can be seen that the radical-scavenging activity was much higher in Example 2 than in Example 1 and Comparative Example. This result seems to be due to the antioxidant effect of the *Vicia amurensis* extract. Therefore, when a *Vicia amurensis* extract is added, it is expected that rancidity and decomposition will be suppressed and thus preservability will be increased, and eating the rice taffy will be beneficial for health.

As described above, since collagen is added, rice taffy of the present invention not only has a high nutritional value, but also is very easy to eat because it does not stick to teeth.

In addition, according to the present invention, it is possible to increase the long-term preservability of rice taffy by suppressing decomposition by adding a *Vicia amurensis* extract having excellent antioxidant activity.

In the above, the present invention has been described with reference to one exemplary embodiment, but the embodiment is only exemplary, and those of ordinary skill in the art will understand that there may be various modifications and equivalents. Therefore, the true scope of protection of the present invention should be determined only by the appended claims.

What is claimed is:

1. A method of manufacturing rice taffy, comprising:
   a saccharification step of saccharifying a mixture of hard-boiled rice, malt, and water and thus obtaining a saccharified solution;
   a concentration step of concentrating the saccharified solution by applying heat and thus obtaining black taffy;
   an addition step of adding collagen and a *Vicia amurensis* extract from *Vicia amurensis* to the black taffy; and
   a stretching step of repeatedly stretching the black taffy to which collagen and the *Vicia amurensis* extract were added.

2. The method of claim 1, wherein the collagen is marine collagen extracted from fish.

* * * * *